United States Patent

Hidaka et al.

[11] Patent Number: 5,534,871
[45] Date of Patent: Jul. 9, 1996

[54] APPARATUS FOR MEASURING PHYSICAL QUANTITY RELATED TO RELATIVE MOVEMENT BETWEEN TWO OBJECTS

[75] Inventors: Keiki Hidaka; Yoichiro Suzuki, both of Kamakura, Japan

[73] Assignee: Mitsubishi Precision Co., Ltd., Japan

[21] Appl. No.: 232,529

[22] Filed: Apr. 25, 1994

[51] Int. Cl.6 ................................................ G01S 13/60
[52] U.S. Cl. ........................................................ 342/113
[58] Field of Search .................................. 342/113, 108, 342/104, 89, 110

[56] References Cited

U.S. PATENT DOCUMENTS

| | | | |
|---|---|---|---|
| 4,041,488 | 8/1977 | Fishbein et al. | 342/89 |
| 4,115,772 | 9/1979 | Valdes | 342/108 |
| 4,219,812 | 8/1980 | Rittenbach | 342/110 |
| 4,241,347 | 12/1980 | Albanese et al. | 342/89 |

FOREIGN PATENT DOCUMENTS

| | | |
|---|---|---|
| 1-321386 | 12/1989 | Japan . |
| 2259820 | 3/1983 | United Kingdom . |

OTHER PUBLICATIONS

"Spread Spectrum Systems With Commercial Applications", Robert C. Dixon, *Direct Sequence Systems*, Third Edition, pp. 18–33, 62–85, 114–133, 158–193.

Primary Examiner—Daniel T. Pihulic
Attorney, Agent, or Firm—Merchant, Gould, Smith, Edell, Welter and Schmidt

[57] ABSTRACT

A measuring apparatus is provided in one of two objects moving relatively to each other. The apparatus includes a circuit for effecting a direct spread modulation with respect to a transmission carrier signal using modulation codes; an antenna unit for transmitting the modulated carrier signal toward the other of the two objects and for receiving a reflection wave therefrom; a circuit for demodulating the received reflection wave signal using the transmission carrier signal; a circuit for making correlation between the demodulated output signal and a signal having the same code as that of the modulation code and having a phase delayed by a predetermined time; a unit for extracting a Doppler frequency component contained in a signal which has been propagated through a propagation path existing in a specified distance range; and a circuit for properly processing the extracted Doppler frequency component. By the constitution, it is possible to precisely measure a speed and/or direction angle of one object relative to the other of the two objects, without being subject to an influence by a reflection in the close neighborhood, or an influence by interference of a transmission signal or interference signal in a receiving channel of the apparatus.

10 Claims, 8 Drawing Sheets

APPARATUS FOR MEASURING PHYSICAL QUANTITY RELATED TO RELATIVE MOVEMENT BETWEEN TWO OBJECTS

BACKGROUND OF THE INVENTION

1. Field of the Invention

The present invention relates to a technique of measuring physical quantities related to a relative movement between two objects, using radio waves. More particularly, it relates to an apparatus for measuring a speed of one object relative to the other, and a direction angle thereof.

2. Description of the Related Art

As an example of the prior art by which the measurement of a speed or direction angle of an object is carried out using radio waves, a system using a frequency-modulated continuous wave (FM-CW system) is known.

For example, using a speed measuring apparatus provided in a moving object such as a vehicle, a flying object, or the like, the measurement of the speed of the moving object is carried out as follows. First, the apparatus transmits a frequency-modulated continuous wave (FM-CW) signal as a radio wave from an antenna toward the ground, and mixes a signal reflected from the ground (i.e., receiving signal) with the transmission signal. The apparatus then extracts from the mixed signal a signal containing a Doppler frequency component based on a speed relative to the ground, and detects the Doppler frequency component to thereby measure the speed of the moving object.

The above FM-CW system, however, poses a problem in that, where the reflection surface for propagation of the transmitted radio wave lies in the close neighborhood of the transmission point, the measuring apparatus is subject to an influence by the reflection in the close neighborhood, and/or an influence by interference of the transmission signal or an interference signal in the receiving system or channel.

Also, where the reflection surface for propagation of the transmitted radio wave lies far away from the transmission point, an influence by the spread of the radio wave beam radiated from the antenna is averaged, and thus the center of power in the frequency band of the receiving signal can be unifiedly determined. However, where the reflection surface for propagation lies in the close neighborhood, a problem occurs in that it is impossible to unifiedly determine the center of power in the frequency band of the receiving signal since conditions of the reflection surface (e.g., the ground) cannot be ignored.

On the other hand, where the direction of a target object is measured using a single antenna, it is necessary to sharpen the beam pattern of the antenna for the purpose of improving the precision of the measurement. To this end, measures must be taken to heighten the frequency of a radio wave signal to be radiated, or to make the size of the antenna per se large. However, the measures are not always effective, much less in the case where the target object lies in the close neighborhood.

To cope with this, an example of the prior art uses two antennas having antenna patterns with slightly different angles. Namely, the example utilizes the fact that the point at which the two antenna patterns cross each other (hereinafter referred to as a "cross point") is unifiedly one point, and thus specifies the direction of the target object.

However, because of complexity of circuit techniques, it has been the state of the art to alternately switch the two antenna patterns. Accordingly, the prior art poses a problem in that, due to a time lag caused by the switching, an error is introduced in the precision of the direction measurement.

SUMMARY OF THE INVENTION

An object of the present invention is to provide a measuring apparatus by which it is possible to precisely measure physical quantities (relative speed and direction angle) related to a relative movement between two objects, without being subject to an influence by a reflection in the close neighborhood, or an influence by interference of a transmission signal or interference signal in a receiving channel of the apparatus.

To attain the above object, the measuring apparatus according to the present invention is provided in one of the two objects and includes: an oscillator for generating a carrier signal for transmission; a code generator for generating a coded two-phase random signal for modulation; a modulation circuit for effecting a direct spread modulation with respect to the transmission carrier signal using the generated coded two-phase random signal; antenna means for transmitting the modulated transmission carrier signal as a radio wave toward the other of the two objects and for receiving a reflection wave from the other of the two objects; a demodulation circuit for demodulating a signal corresponding to the received reflection wave using the transmission carrier signal, to thereby generate an intermediate frequency signal; a correlation circuit for making correlation between the intermediate frequency signal generated by the demodulation circuit and a signal having the same code as that of the coded two-phase random signal for modulation and having a phase delayed by a predetermined time compared with the coded two-phase random signal for modulation; filtering means for extracting from an output signal of the correlation circuit a Doppler frequency component contained in a signal which has been propagated through a propagation path existing in a specified distance range; and a detection circuit for properly processing a signal of the extracted Doppler frequency component, to thereby detect physical quantities related to a movement relative to the other of the two objects.

In a preferred aspect-of the present invention, the antenna means includes first and second antennas having antenna patterns with different beam angles, respectively.

Also, in the preferred aspect of the present invention, the code generator generates two kinds of coded two-phase random signals with different phases, and each of the first and second antennas transmits and receives a signal modulated by a corresponding one of the two kinds of coded two-phase random signals. In this case, the detection circuit extracts only a Doppler frequency component contained in a reflection wave from an overlapped area of each antenna pattern of the first and second antennas, and based on the extracted Doppler frequency component, detects physical quantities related to a relative movement between the two objects.

Also, in the preferred aspect of the present invention, the measuring apparatus further includes delay means provided between the code generator and the correlation circuit, for giving a delay of the predetermined time to the coded two-phase random signal for modulation generated by the code generator. The delay of the predetermined time is selected to be a time in which each of radio wave signals radiated from the first and second antennas goes to and comes back from a reflection surface existing in the specified distance range.

The delay means may include a shift register with a plurality of taps provided for each bit output, or may include a delay line with a plurality of output taps. In this case, the delay of the predetermined time is determined according to a proper selection from among the plurality of taps.

Also, in the preferred aspect of the present invention, the measuring apparatus further includes circulating means for feeding the modulated transmission carrier signal to the antenna means and for feeding the reflection wave signal received by the antenna means to the demodulation circuit.

Furthermore, in the preferred aspect of the present invention, the filtering means includes first and second band pass filters responsive to signals fed from the first and second antennas, respectively, via the correlation circuit thereto.

According to the above constitution of the present invention, the coded two-phase random signal contained in the reflection wave from the other of the two objects (e.g., the ground) possesses a time difference corresponding to the propagation distance in which the radio wave signal goes to and comes back from the ground or the like, with respect to the coded two-phase random signal contained in the transmission signal. Accordingly, the output based on a correlation between the two kinds of codes presents a peak value when the time difference (i.e., the phase difference) is equal to zero, and as the phase difference increases, the correlation output is accordingly lowered in level. When the phase difference exceeds time corresponding to one clock, the correlation output cannot be substantially obtained. The principle regarding a correlation between coded two-phase random signals is described, for example, in the publication entitled "SPREAD SPECTRUM SYSTEMS" by R. C. Dixon.

Figure 4:
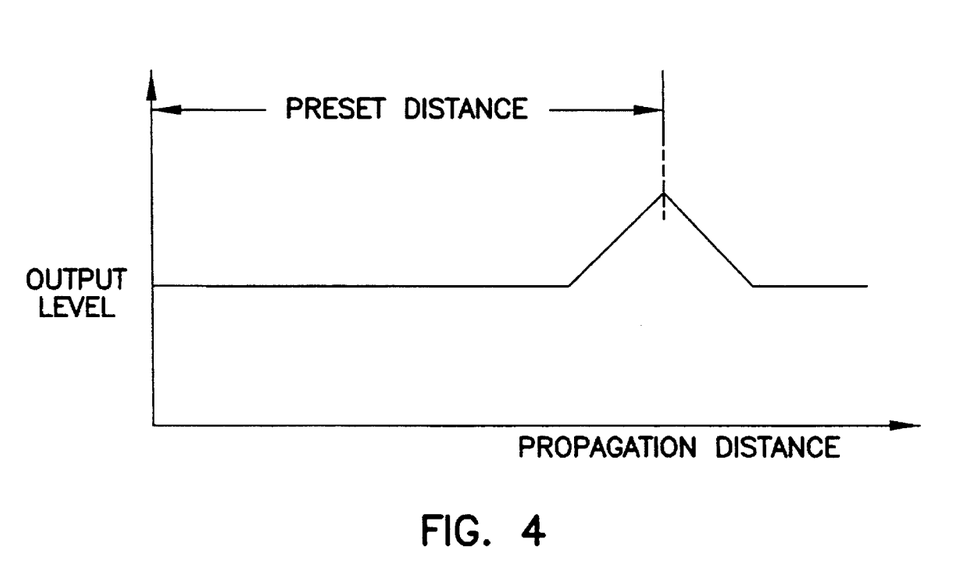
FIG. 4 is a diagram showing the relationship between the propagation distance of a radio wave signal transmitted from the antenna shown in FIG. 1 and the output of the correlation circuit.

From the above, it will be appreciated that, when a correlation is made between the coded two-phase random signal contained in the reflection wave signal and another coded two-phase random signal delayed in advance by time corresponding to the propagation distance, the phase difference becomes zero and thus the correlation output presents a peak value. Concretely, when the correlation is made between the intermediate frequency signal generated by the demodulation circuit and a signal having the same code as that of the coded two-phase random signal for modulation and having a phase delayed in advance by time corresponding to the propagation distance, a correlation output obtained from a signal propagated in the preset propagation distance presents a peak value. However, with respect to a propagation distance other than the preset propagation distance, no correlation output can be substantially obtained (see FIG. 4).

Therefore, the correlation circuit can output a specified signal which is free from influences by a signal propagated in a propagation distance other than the preset propagation distance (i.e., influences by a reflection in the close neighborhood, or by an interference signal). The specified signal is input to the filtering means, where a Doppler frequency component is extracted from the signal. A signal of the extracted Doppler frequency component is input to the detection circuit, which in turn effects a proper processing to thereby detect physical quantities (relative speed and/or direction angle) related to a relative movement between the two objects.

Figure 5:
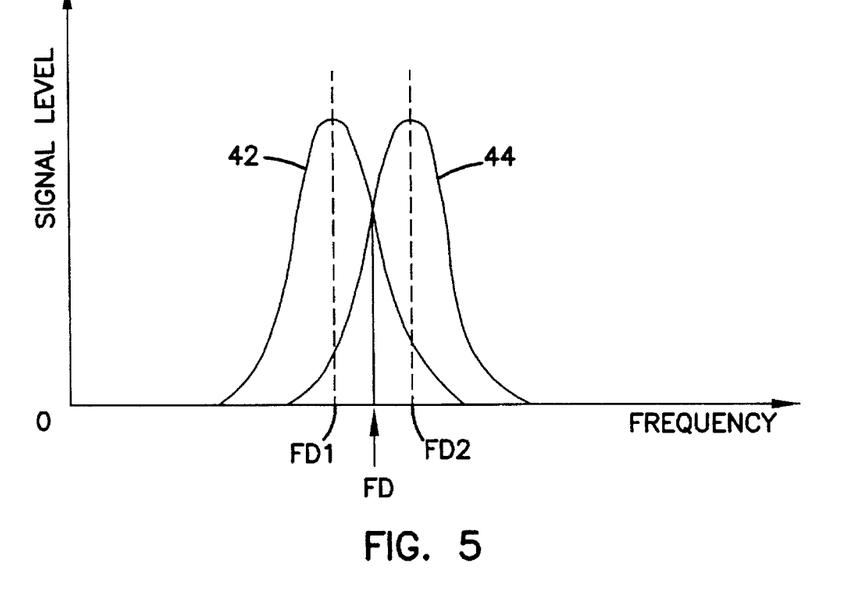
FIG. 5 is an operational waveform diagram of the respective output signals of the correlation circuits shown in FIG. 1.

Also, where the antenna means includes two antennas having antenna patterns with different beam angles, respectively, output waveforms obtained through the correlation circuit from each antenna present peak values, respectively, at different Doppler frequencies (see FIG. 5, frequencies $f_{d1}$, $f_{d2}$).

Figure 6:
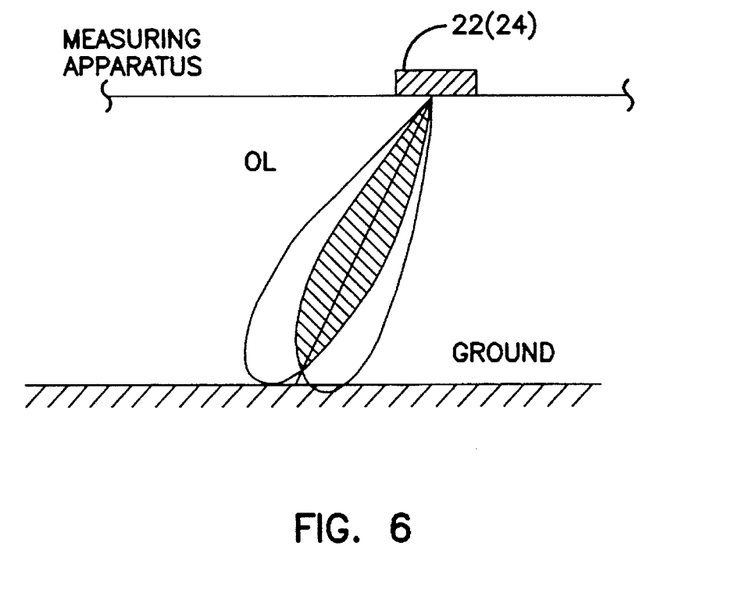
FIG. 6 is a diagram showing the respective antenna patterns of the antennas shown in FIG. 1.

In this case, Doppler frequency components contained in the receiving signal propagated in the overlapped area (see FIG. 6, hatched portion OL) of the two antenna patterns have the same phase and the same level, and thus they correspond to the overlapped portion (see FIG. 5, frequency $f_d$) of outputs of the respective correlation circuits. The Doppler frequency components are input via the filtering means to the detection circuit, which in turn extracts a Doppler frequency component contained in a signal which has been propagated through a specified propagation path. Thus, based on proper processings of the extracted Doppler frequency component, it is possible to precisely measure a speed of one object relative to the other.

Also, by spreading spectra of the transmission signals of the two antennas using different two-phase random codes, respectively, and by inversely spreading spectra of the receiving signals using the same code as that used in the transmission signals, it is possible to separate signals of each antenna pattern simultaneously and without any interference with each other, although the respective carrier signals for transmission are the same. Accordingly, it is possible to specify the cross point of the two antenna patterns easily and precisely. As a result, it is possible to precisely determine a direction angle of one object relative to the other.

In this case, it should be noted that, even if a reflection wave signal corresponding to a radio wave signal radiated from one antenna is received at the other antenna, it is possible to remove any influence due to the receiving by the other antenna. This is because the respective coded two-phase random signals transmitted from the two antennas are sufficiently separated in phase from each other.

BRIEF DESCRIPTION OF THE DRAWINGS

Other objects and features of the present invention will be described hereinafter in detail by way of preferred embodiments with reference to the accompanying drawings, in which.

DESCRIPTION OF THE PREFERRED EMBODIMENTS

Figure 1:
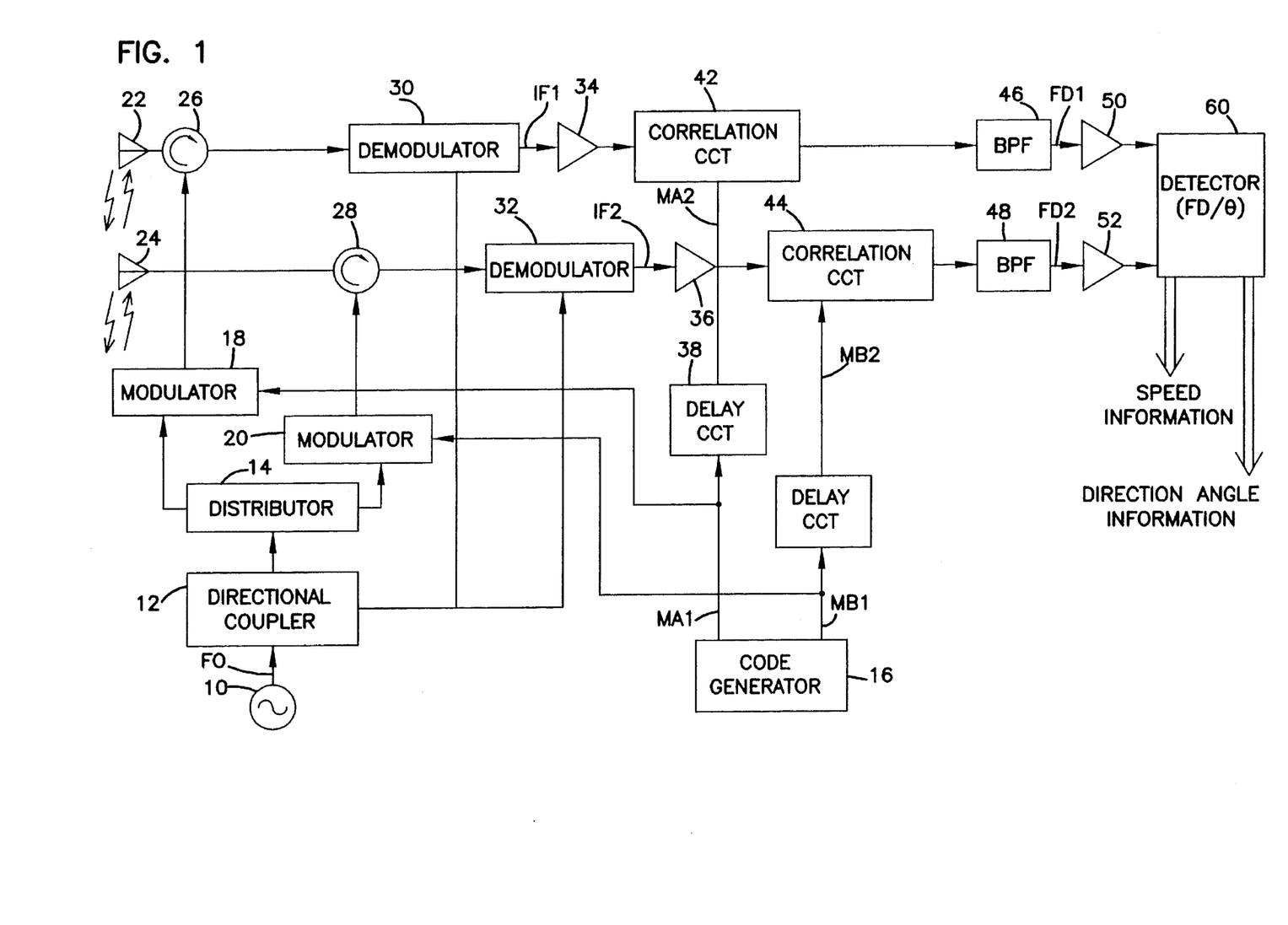
FIG. 1 is a block diagram illustrating the constitution of the measuring apparatus according to an embodiment of the present invention.

FIG. 1 illustrates the constitution of the measuring apparatus according to an embodiment of the present invention.

The illustrated apparatus is intended to measure a speed of one object relative to the other, and a direction angle thereof. In one application, the present apparatus is provided in a vehicle (train or tram) traveling on a railroad track, and is directed to measuring a speed of the vehicle. In another application, the present apparatus is provided in a gimbal system of a radar equipment, and is directed to measuring a direction angle of a flying object coming near the radar equipment.

In FIG. 1, reference 10 denotes an oscillator for generating a carrier signal $f_0$ for transmission; reference 12 a directional coupler for distributing an output $f_0$ of the oscillator 10 into two signals (i.e., a signal used for transmission, and a signal used for demodulation of receiving signals); reference 14 a distributor for distributing one output (signal used for transmission) of the directional coupler 12 into two channels; reference 16 a code generator for generating two kinds of variable coded two-phase random signals (modulation codes) MA1 and MB1; and references 18 and 20 each a modulator responsive to an output (modulation code MA1 or MB1) of the code generator 16 and to the transmission carrier signal $f_0$ fed via the directional coupler 12 and the distributor 14. The modulators 18 and 20 effect a direct spread modulation with respect to the transmission carrier signal $f_0$, using the respective modulation codes MA1 and MB1.

Also, references 22 and 24 denote each an antenna for radiating a radio wave beam toward the ground or the air and for receiving reflection waves from the ground or the like, for the radiated beam; references 26 and 28 each a circulator for feeding an output of the corresponding modulator 18, 20 to the corresponding antenna 22, 24 and for receiving a reflection wave signal received by the corresponding antenna; references 30 and 32 each a demodulator for mixing an output of the corresponding circulator 26, 28 with another output (signal used for the receiving signal demodulation, i.e., local signal) of the directional coupler 12, to thereby generate an intermediate frequency signal IF1, IF2; and references 34 and 36 each an amplifier for amplifying the output signal IF1, IF2 of the corresponding demodulator 30, 32.

Also, references 38 and 40 denote each a delay circuit for delaying the corresponding coded two-phase random signal MA1, MB1 output from the code generator 16 by a variable delay quantity, to thereby output a delayed coded two-phase random signal MA2, MB2; and references 42 and 44 each a correlation circuit for making correlation between the output (intermediate frequency signal) of the corresponding amplifier 34, 36 and the output MA2, MB2 of the corresponding delay circuit 38, 40. Although not shown in FIG. 1, each of the delay circuits 38 and 40 can be constituted, for example, by a shift register with a plurality of taps provided for each bit output, or by a delay line with a plurality of output taps. In this case, the coded two-phase random signal MA2, MB2 output from each delay circuit 38, 40 is selected to have the same code as that of the coded two-phase random signal MA1, MB1 used for modulation and to have a phase delayed by a predetermined time compared with the coded two-phase random signal MA1, MB1. The predetermined time is set to be a time in which the radio wave signal radiated from each antenna 22, 24 goes to and comes back from the ground or the like. The setting of the delay quantity is carried out based on a proper selection from among the plurality of output taps.

Furthermore, references 46 and 48 denote each a band pass filter (Doppler filter) for extracting from an output signal of the corresponding correlation circuit 42, 44 a specified frequency component (i.e., a Doppler frequency component contained in a signal which has been propagated through a specified propagation path corresponding to the delay quantity of each delay circuit 38, 40); references 50 and 52 each an amplifier for amplifying an output signal of the corresponding band pass filter 46, 48; and reference 60 a detector for properly processing signals of two extracted Doppler frequency components and thereby detecting the speed of a vehicle and/or the direction angle of a flying object.

Figure 2:
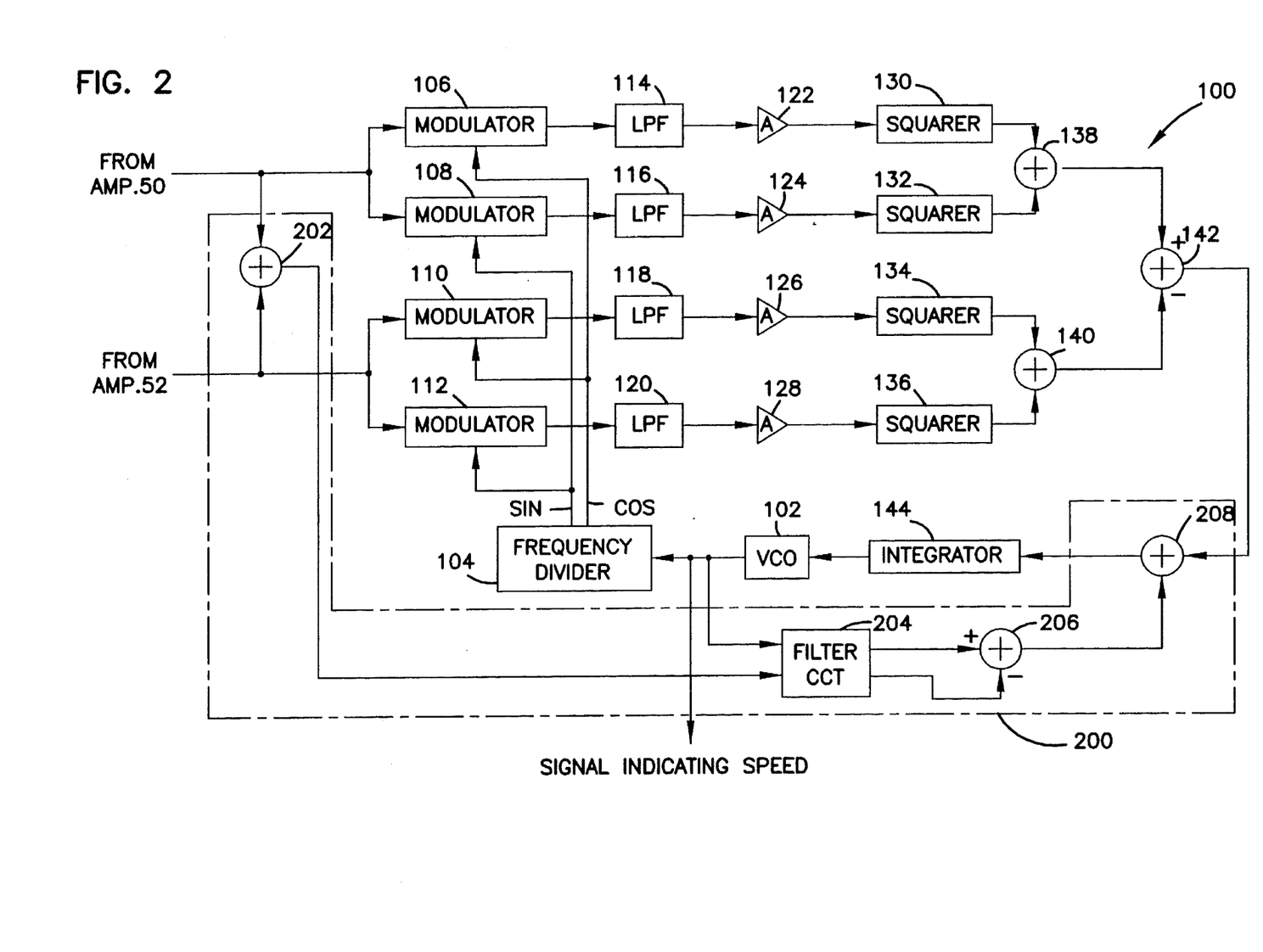
FIG. 2 is a block diagram illustrating the constitution of the detector in one application of the embodiment of FIG. 1.

FIG. 2 illustrates the circuit constitution of the detector 60 intended to measure the speed of a vehicle. The illustrated detector is constituted by a Doppler frequency tracking circuit section 100 constituted in the form of a loop, and a loop control circuit section 200. Note, a "Doppler frequency to be tracked" referred to here corresponds to the aforementioned cross point.

The Doppler frequency tracking circuit section 100 includes a voltage-controlled oscillator (VCO) 102; a frequency divider 104 for frequency-dividing an output of the VCO 102 to thereby generate two kinds of frequency-divided signals COS and SIN with different phases by 90°; balanced modulators 106, 108, 110 and 112 each for modulating an output of the corresponding amplifier 50, 52 using the frequency-divided signal COS or SIN; low pass filters (LPFs) 114, 116, 118 and 120 each for passing lower frequency components of an output signal of the corresponding modulator; amplifiers 122, 124, 126 and 128 each for amplifying an output signal of the corresponding LPF; squarers 130, 132, 134 and 136 each for multiplying an output of the corresponding amplifier by itself; an adder 138 for making an addition of each output of the squarers 130 and 132; an adder 140 for making an addition of each output of the squarers 134 and 136; a difference-making circuit 142 for making a difference between each output of the adders 138 and 140; and an integrator 144 for integrating the sum of an output of the difference-making circuit 142 and an output of a difference-making circuit 206 (stated later) and for feeding the integrated output to the VCO 102.

On the other hand, the loop control circuit section 200 includes an adder 202 for making an addition of each output of the amplifiers 50 and 52; a filter circuit 204 containing a high pass filter (HPF) and a low pass filter (LPF) constituted in the form of a switched-capacitor system and synchronized with the output frequency of the VCO 102, and responsive to an output of the adder 202 and the output of the VCO 102; a difference-making circuit 206 for making a difference between each output of the HPF and LPF in the filter circuit 204; and an adder 208 for making the sum of an output of the difference-making circuit 206 and the output of the difference-making circuit 142 and for feeding the sum output to the integrator 144.

Figure 8:
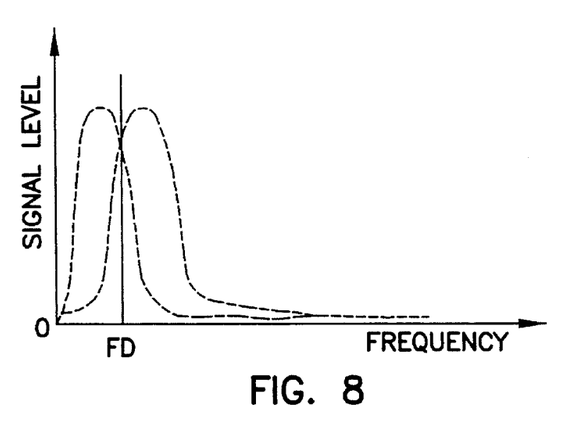
FIG. 8 is a signal waveform diagram for explaining the operation of the detector in one application of the embodiment of FIG. 1.

In the constitution of FIG. 2, the Doppler frequency tracking circuit section 100 functions, as a whole, to track and specify a single Doppler frequency which exactly corresponds to the cross point (see FIG. 9b) at which the two antenna patterns by the antennas 22, 24 cross each other. Also, where the difference between a Doppler frequency which is currently being tracked, and each of the Doppler frequencies extracted through the band pass filters 46, 48, deviates out of a predetermined frequency range, the loop control circuit section 200 functions to control the Doppler frequency tracking circuit section 100 to place the Doppler frequency to be tracked into the predetermined frequency range. Thus, the VCO 102 in the Doppler frequency tracking circuit section 100 can output a signal of the specified Doppler frequency $f_d$, as shown in FIG. 8. The frequency $f_d$ corresponds to the speed of the vehicle.

Figure 3:
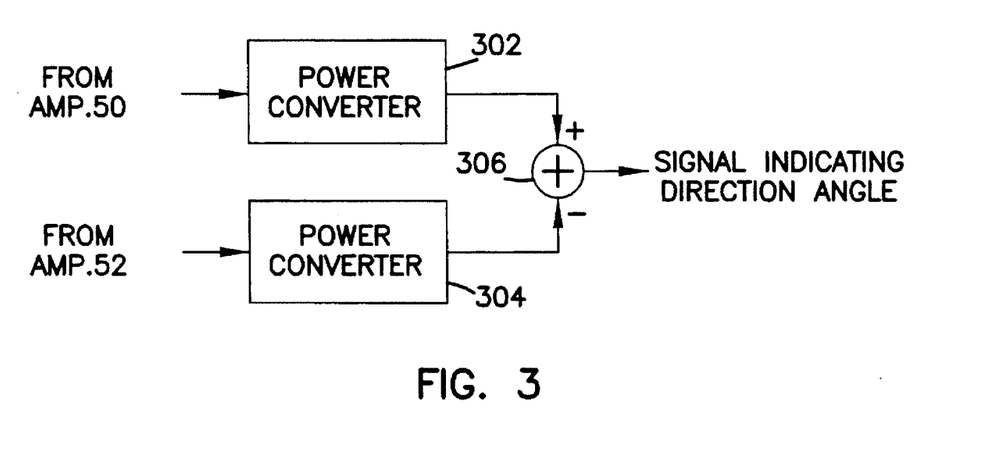
FIG. 3 is a block diagram illustrating the constitution of the detector in another application of the embodiment of FIG. 1.

FIG. 3 illustrates the circuit constitution of the detector 60 intended to measure the direction angle of a flying object.

The illustrated detector is constituted by power converters 302 and 304 for effecting a power conversion of the corresponding output of the amplifiers 50 and 52, respectively, and a difference-making circuit 306 for making a difference between each output of the power converters 302 and 304.

Figure 9A:
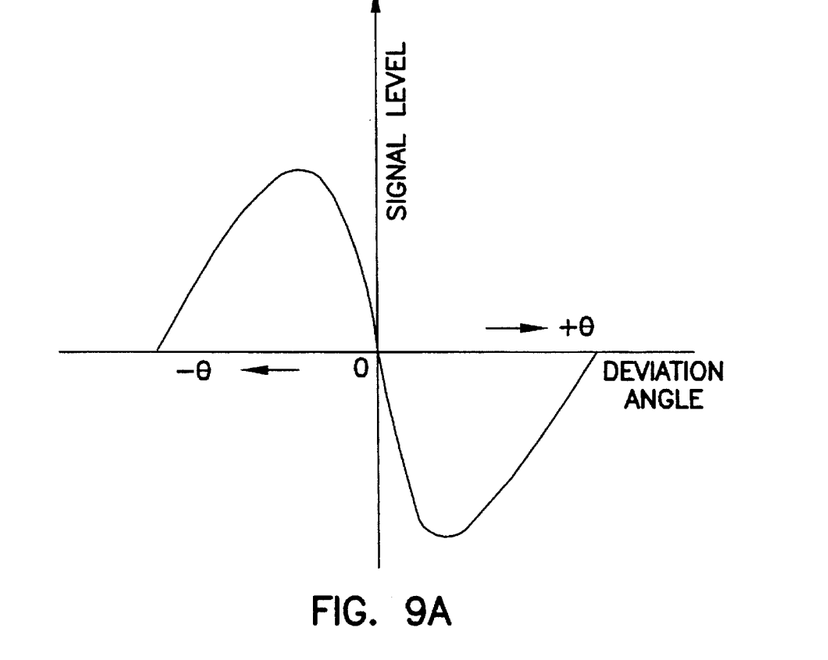
FIGS. 9a and 9b are diagrams for explaining the operation of the detector in another application of the embodiment of FIG. 1.
Figure 9B:
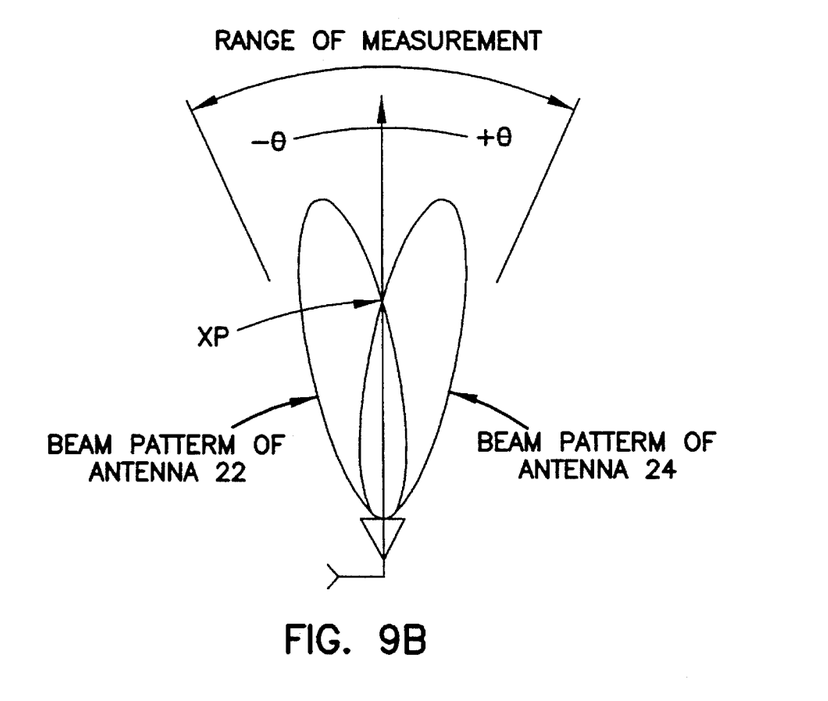

According to the constitution of FIG. 3, an output signal of the difference-making circuit 306 is changed, as shown in FIG. 9a (see SIGNAL LEVEL), according to the magnitude and polarity of the difference between the outputs of the power converters 302 and 304. Accordingly, by obtaining a signal level value from the characteristic curve of FIG. 9a, it is possible to specify a deviation angle θ corresponding to the obtained signal level value. The specified deviation angle indicates the direction in which a target object to be detected exists, and which lies within the range of measurement as shown in FIG. 9b. Note, in FIG. 9b, reference XP denotes the cross point of the two antenna patterns. Thus, the difference-making circuit 306 outputs a signal indicating the direction angle θ of the target object (flying object).

Next, the operation of the measuring apparatus according to the present embodiment (see FIG. 1) will be explained with reference to the signal waveforms shown in FIGS. 7a to 7h, FIG. 8, and FIG. 9a.

Figure 7A:
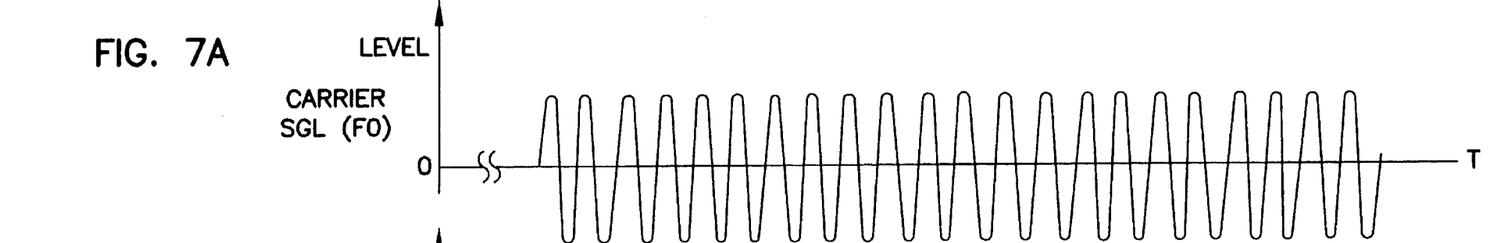
FIGS. 7a to 7h are operational waveform diagrams of the signals at each portion in the constitution of FIG. 1.
Figure 7B:
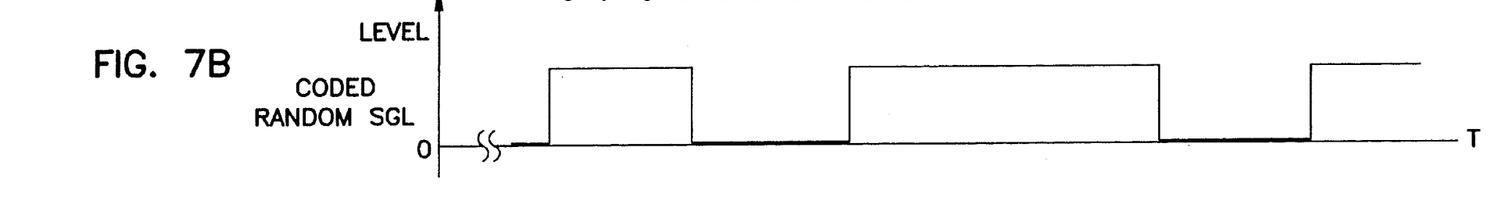
Figure 7C:
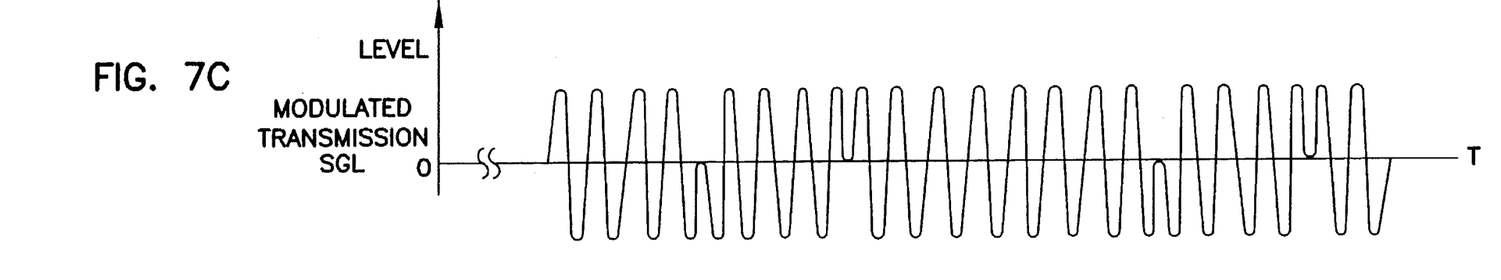
Figure 7D:
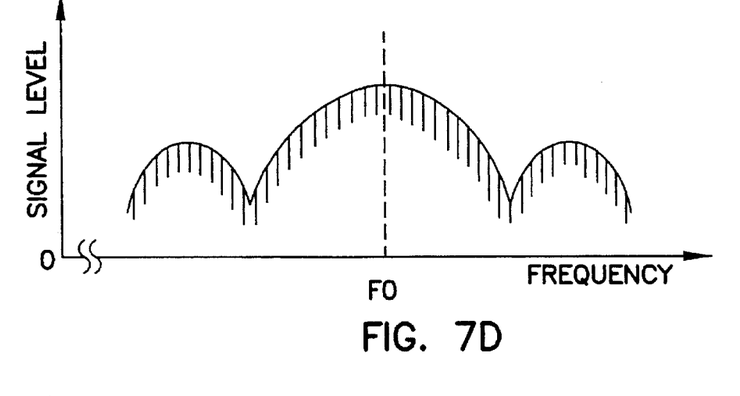

In the constitution of FIG. 1, the modulators 18 and 20 effect a direct spread modulation with respect to the transmission carrier signal $f_0$ (see FIG. 7a) fed from the oscillator 10 via the directional coupler 12 and the distributor 14, using the coded two-phase random signals MA1, MB1 (see FIG. 7b) fed from the code generator 16. The respective modulated transmission signals (see FIG. 7c) are fed via the circulators 26, 28 to the antennas 22, 24, respectively, and then are radiated in a spread state as shown in FIG. 7d, from the antennas 22, 24 toward the ground or the like.

Figure 7E:
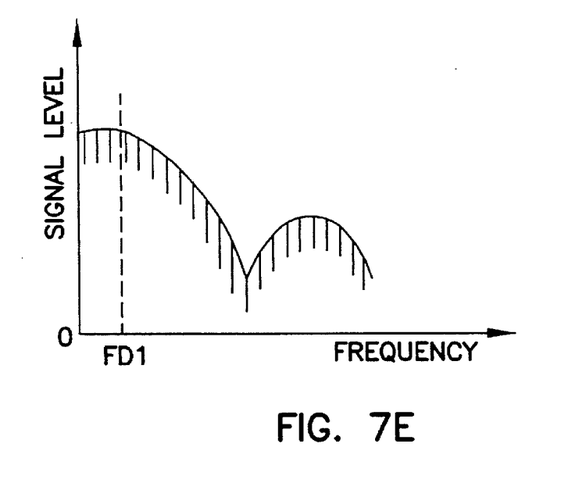
Figure 7F:
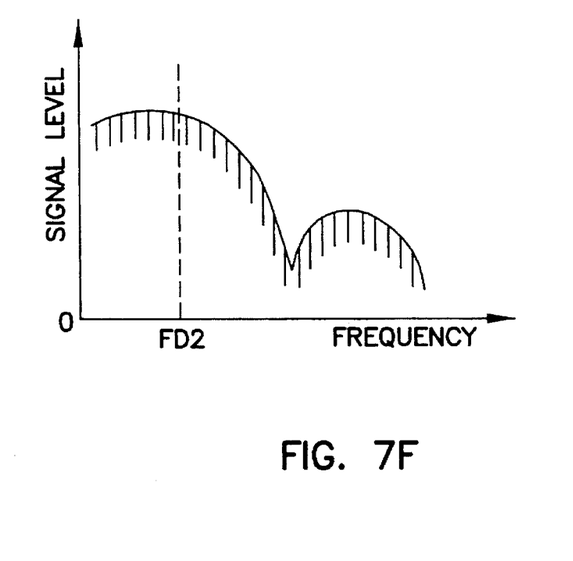

The reflection waves from the ground or the like, for the radiated radio wave signals, are received by the antennas 22, 24, in a state containing influences by a reflection in the close neighborhood or an interference of the transmission signals or any interference signal in the receiving channel. The received signals are fed via the circulators 26, 28 to the demodulators 30, 32, respectively. The demodulators 30, 32 mix the receiving signals fed from the circulators 26, 28 with the local signal fed from the directional coupler 12, and thereby generate the intermediate frequency signals IF1, IF2, respectively. Namely, where Doppler frequency components contained in the signals received by the antennas 22 and 24 are represented by $f_{d1}$ and $f_{d2}$, respectively, the received signals are demodulated by the demodulators 30, 32, as shown in FIGS. 7e and 7f, respectively. The signals demodulated by the demodulators 30, 32 (i.e., intermediate frequency signals IF1, IF2) are amplified by the amplifiers 34, 36, and then fed to the correlation circuits 42, 44, respectively.

On the other hand, the coded two-phase random signals MA1, MB1 (modulation codes) output from the code generator 16 are phase-delayed by the delay circuits 38, 40, respectively, by the aforementioned predetermined time (i.e., by the time in which the radio wave signal is propagated through a specified propagation path). The delayed coded two-phase random signals MA2, MB2 are fed to the correlation circuits 42, 44, respectively.

Figure 7G:
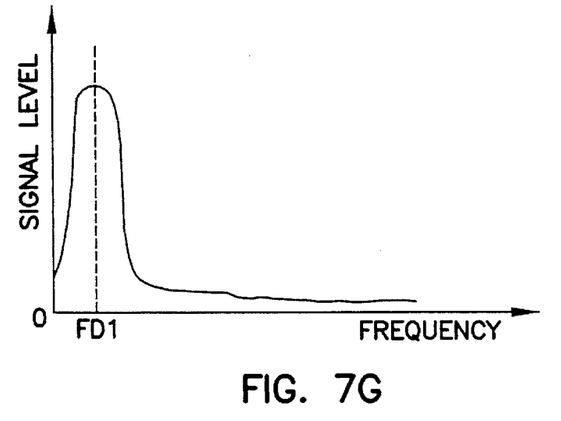
Figure 7H:
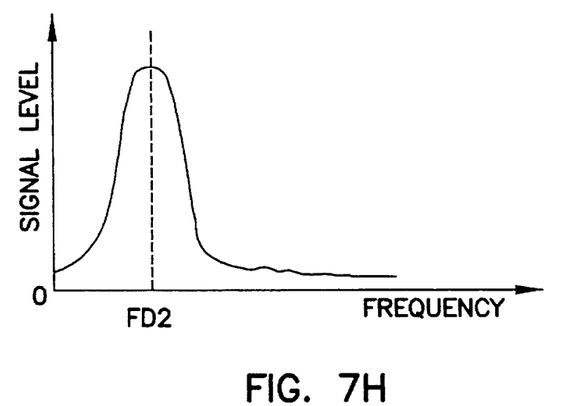

The correlation circuits 42, 44 make correlation of the intermediate frequency signals IF1, IF2 fed from the demodulators 30, 32 via the amplifiers 34, 36, with the delayed coded two-phase random signals MA2, MB2 fed from the delay circuits 38, 40, respectively, and thereby output the Doppler frequency components ($f_{d1}$, $f_{d2}$) contained in the reflection waves from the specified distance range. The signals containing the Doppler frequency components output from the correlation circuits 42, 44 are output through the band pass filters 46, 48, as shown in FIGS. 7g and 7h, respectively. The outputs of the band pass filters 46, 48 are amplified by the amplifiers 50, 52, respectively, and then fed to the detector 60.

Where the constitution of FIG. 2 is adopted as the detector 60, the Doppler frequency tracking circuit section 100 and the loop control circuit section 200 cooperate with each other, and thereby extract from the two extracted Doppler frequency components ($f_{d1}$, $f_{d2}$) a Doppler frequency component $f_d$ having the same phase and the same signal level, as shown in FIG. 8. The detector (circuit sections 100, 200) shapes the extracted Doppler frequency component into pulses, and measures the pulse period to thereby detect the speed of the vehicle. Namely, a signal indicating the speed is generated.

On the other hand, where the constitution of FIG. 3 is adopted as the detector 60, the detector effects power conversions with respect to the two extracted Doppler frequency components $f_{d1}$, $f_{d2}$, respectively, and then makes a difference between the converted outputs, to thereby detect the direction angle of a flying object coming near the radar equipment. Namely, a signal indicating the direction angle is generated.

As explained above, the measuring apparatus according to the present embodiment is based on the principle of extracting only Doppler frequency components contained in a signal which has been propagated through a specified propagation path, and of properly processing the extracted Doppler frequency components. Thus, it is possible to precisely measure the speed of a vehicle where the apparatus is provided in the vehicle, and to precisely measure the direction angle of a flying object where the apparatus is provided in a radar equipment, without being subject to any influence by a reflection in the close neighborhood, or by interference of the transmission signal or interference signal in the receiving channel.

Also, it is possible to set the distance between the present apparatus and a reflection surface such as the ground or the like, by suitably carrying out an initial setting of the phase difference between the coded two-phase random signals MA1, MB1 fed from the code generator 16 to the modulators 18, 20 and the coded two-phase random signals MA2, MB2 fed from the code generator 16 via the delay circuits 38, 40 to the correlation circuits 42, 44. The initial setting can be carried out, as previously described, based on a proper selection from among the plurality of taps provided in the shift register or delay line constituting each delay circuit 38, 40.

Although, in the above one application of the embodiment, the case where the apparatus is provided in the vehicle with wheels to thereby measure the speed of the vehicle has been explained, the present invention is not restrictive thereto. For example, the present apparatus can be provided in a moving object without wheels, such as a linear motor car, or the like, to thereby measure the speed of the moving object. Also, where the speed of the moving object is detected, it is possible to exactly determine the acceleration and/or traveling distance of the moving object based on the speed information. Accordingly, the present invention is also applicable to an accelerometer and/or distance measuring apparatus.

Although the present invention has been disclosed and described by way of one embodiment containing two applications, it is apparent to those skilled in the art that other embodiments and modifications of the present invention are possible without departing from the essential features thereof.

We claim:

1. An apparatus for measuring physical quantities related to a relative movement between two objects, the apparatus being provided in one of the two objects and comprising:

an oscillator for generating a carrier signal for transmission;

a code generator for generating first and second coded two-phase random signals for modulation, each of said first and second kinds of coded two-phase random signals having different phases;

a modulation circuit for effecting a direct spread modulation with respect to the transmission carrier signal using the generated coded two-phase random signal;

antenna means comprising first and second antennas having antenna patterns with different beam angles for transmitting the modulated transmission carrier signal as a radio wave toward the other of the two objects and for receiving a reflection wave from the other of the two objects, each of said first and second antennas transmitting and receiving a signal modulated by a corresponding one of the first and second kinds of coded two-phase random signals;

a demodulation circuit for demodulating a signal corresponding to the received reflection wave using the transmission carrier signal, to thereby generate an intermediate frequency signal;

a correlation circuit for making correlation between the intermediate frequency signal generated by the demodulation circuit and a signal having the same code as that of the coded two-phase random signal for modulation and having a phase delayed by a predetermined time compared with the coded two-phase random signal for modulation;

filtering means for extracting from an output signal of the correlation circuit a Doppler frequency component contained in a signal which has been propagated through a propagation path existing in a specified distance range; and a detection circuit for properly processing a signal of the extracted Doppler frequency component, said detection circuit extracting only a Doppler frequency component contained in the reflection wave from an overlapped area of each antenna pattern of the first and second antennas and, based on the extracted Doppler frequency component, detecting physical quantities related to the relative movement between the two objects.

2. The apparatus as set forth in claim 1, further comprising delay means provided between the code generator and the correlation circuit, for giving a delay of the predetermined time to the coded two-phase random signal for modulation generated by the code generator, the delay of the predetermined time being selected to be a time in which each of radio wave signals radiated from the first and second antennas goes to and comes back from a reflection surface existing in the specified distance range.

3. The apparatus as set forth in claim 2, wherein the delay means comprises a shift register with a plurality of taps provided for each bit output, the delay of the predetermined time being determined according to a proper selection from among the plurality of taps.

4. The apparatus as set forth in claim 2, wherein the delay means comprises a delay line with a plurality of output taps, the delay of the predetermined time being determined according to a proper selection from among the plurality of output taps.

5. The apparatus as set forth in claim 1, further comprising circulating means for feeding the modulated transmission carrier signal to the antenna means and for feeding the reflection wave signal received by the antenna means to the demodulation circuit.

6. The apparatus as set forth in claim 2, wherein the filtering means comprises first and second band pass filters responsive to signals fed from the first and second antennas, respectively, via the correlation circuit thereto.

7. The apparatus as set forth in claim 6, wherein, where the apparatus is provided in a moving object such as a vehicle, or the like, the detection circuit generates a signal indicating a speed of the moving object.

8. The apparatus as set forth in claim 7, wherein the detection circuit comprises:

a Doppler frequency tracking circuit section responsive to signals containing Doppler frequencies extracted through the first and second band pass filters, for tracking and specifying a single Doppler frequency which exactly corresponds to a cross point at which two antenna patterns by the first and second antennas cross each other; and a control circuit section for controlling the Doppler frequency tracking circuit section to place a Doppler frequency which is currently being tracked, into a predetermined frequency range.

9. The apparatus as set forth in claim 6, wherein, where the apparatus is provided in a radar equipment, the detection circuit generates a signal indicating a direction angle of a flying object coming near the radar equipment.

10. The apparatus as set forth in claim 9, wherein the detection circuit comprises a pair of power converters for effecting a power conversion of a corresponding output of the first and second band pass filters, respectively, and a circuit for making a difference between each output of the power converters.

* * * * *